United States Patent Office 3,129,241
Patented Apr. 14, 1964

3,129,241
PREPARATION OF ACETONITRILE
Lawrence J. Krebaum, Texas City, Tex., assignor to Monsanto Chemical Company, St. Louis, Mo., a corporation of Delaware
No Drawing. Filed Aug. 9, 1960, Ser. No. 48,350
5 Claims. (Cl. 260—465.3)

The present invention relates to a process for the preparation of acetonitrile. More particularly, it relates to a process for preparing acetonitrile from methane.

Acetonitrile is a chemical compound with considerable industrial potential. In addition to its general utility as an organic intermediate in various syntheses such as the synthesis of certain vitamins, for example, it is highly suitable for use as a specialty solvent because of its stability under a wide range of conditions. Commercial exploitation of acetonitrile, however, has been hampered by the fact that no efficient and economical method has been known for producing this nitrile industrially. Conventional laboratory methods of preparation such as the dehydration of acetamide or the reaction between methyl halides and alkali metal cyanides are not practical for commercial production. Even the most promising route, that involving the reaction of acetylene and ammonia at high temperatures in the presence of contact catalysts, has definite drawbacks. The reaction conditions in the acetylene-ammonia system are favorable to the formation of pyridine derivatives and the suppression of such side reactions requires excessively long contact times. Another disadvantage lies in the problems associated with the handling of acetylene so as to avoid explosive decompositions.

A new process has recently been disclosed for producing acetonitrile which comprises reacting hydrogen cyanide and methane in the vapor phase at elevated temperatures. The process uses readily available raw materials and is, in general, efficient, economical and adapted for commercial operation. It has now been discovered, however, that the efficiency of this new process can be significantly improved by the use of a catalyst or initiator in the reaction. According to the present invention, acetonitrile is produced by heating a gaseous mixture of hydrogen cyanide and methane at elevated temperatures in the presence of a catalytic amount of a free-radical-generating compound, i.e., a material which under the reaction conditions employed decomposes to yield free radicals. The presence of the free radicals in the reacting gas mixture serves to catalyze the reaction so that at given temperatures and reactant ratios, conversion of the cyanide and hydrocarbon to acetonitrile is considerably increased.

The invention is illustrated in the following example which, however, is not to be construed as limiting it in any manner whatsoever.

EXAMPLE 1

The experimental apparatus was comprised of a reactor consisting of an unpacked "Vycor" (96% silica) tube having an effective length of 20 cm. disposed within a muffle furnace together with inlet and outlet manifolds, an HCN vaporizer and accessory lines, a mixing chamber for the reactant gases, and a product gas receiver. Prior to a run, the system was warmed up while argon was passed through it. Methane and HCN vapors were fed through rotameters into the mixing chamber and then passed through the reactor which had been heated to the desired temperature. The effluent gas from the reactor was collected in a heated receiver from which it was exhausted into a sample bomb. Contact times in the reactor were varied by using tubes of various diameters, by changing feed rates, or by adding an inert diluent such as argon to the reaction mixture. A series of runs was made following this procedure under varying conditions of temperature, reactant feed ratio and contact times. In certain of these runs, small amounts of acetonitrile, dimethyl ether, or propylene were introduced into the mixed feed gases in the mixing chamber prior to their entrance into the reactor. Effluent gas samples were obtained and analyzed by means of a mass spectrometer. To obtain realistic values for the higher boiling product, the sample bomb and spectrometer inlet system were heated. Conversions calculated from the analytical data under the various conditions are recorded in Table I.

Table I

| Run No. | Temp. (° C.) | Feed Mole Ratio (HCN/CH$_4$) | Reaction Time (Sec.) | Catalyst | Amt. Cat. (Mole Percent of Feed) | HCN Conv. (Percent) |
|---|---|---|---|---|---|---|
| 1 | 800 | 1.45/1 | 0.9 | None | | 1.8 |
| 2 | 800 | 1.44/1 | 1.1 | Acetonitrile | 4.3 | 14.5 |
| 3 | 800 | 1.44/1 | 1.1 | do | 5.0 | 17.8 |
| 4 | 800 | 1.45/1 | 3.3 | None | | 10.5 |
| 5 | 800 | 1.67/1 | 2.9 | Propylene | 7.3 | 19.9 |
| 6 | 850 | 1/1 | 0.6 | None | | 12.0 |
| 7 | 850 | 1/1 | 0.6 | Dimethyl Ether | 0.57 | 14.1 |
| 8 | 850 | 1/1 | 0.6 | do | 1.07 | 15.0 |
| 9 | 850 | 1/1 | 0.6 | do | 2.03 | 24.0 |
| 10 | 850 | 1.1/1 | 1.0 | None | | 19.6 |
| 11 | 850 | 1.1/1 | 1.0 | Dimethyl Ether | 0.58 | 22.2 |
| 12 | 850 | 1.1/1 | 1.0 | do | 1.40 | 25.2 |
| 13 | 850 | 1.1/1 | 1.0 | do | 2.15 | 26.6 |
| 14 | 700 | 1.37/1 | 1.6 | None | | 2.9 |
| 15 | 700 | 1.33/1 | 1.6 | Dimethyl Ether | 1.08 | 5.9 |
| 16 | 700 | 1.33/1 | 1.6 | do | 3.38 | 11.5 |

It is apparent from the foregoing data that the presence of acetonitrile, propylene, or dimethyl ether in relatively small amounts in the reaction mixture leads to increased conversions of the reacting gases to acetonitrile.

As catalysts or initiators for inducing the reaction of hydrogen cyanide and methane to produce acetonitrile there may be used any compounds which will generate free radicals under the reaction conditions. These may be described generally as compounds which have an energy of activation below that for methane and particularly those compounds which have an energy of activation of about 80 Kcal. or less. Specific classes of compounds which are suitable include aliphatic nitriles such as acetonitrile exemplified, propionitrile, butyronitrile, acrylonitrile, and the like; olefins and particularly olefins with allylic hydrogens such as butylene, octene-1, cyclohexene and the like; other ethers such as ethyl, propyl and butyl ethers as well as dioxane, furan, tetrahydrofuran, pyran and the like; peroxides and hydroperoxides such as diacetyl peroxide, benzoyl peroxide, ditertiary butyl peroxide, acetyl benzoyl peroxide, dipropionyl peroxide, dimethyl peroxide, diethyl peroxide, methyl hydroperoxide, ethyl hydroperoxide, tert-butyl hydroperoxide, diisopropylbenzene hydroperoxide, di-tert-butyl hydroperoxide and the like; azo compounds such as azobisisobutyronitrile, diazomethane and the like; peroxy esters such as tert-butyl peracetate, tert-butyl perbenzoate, di-tert-butyl diperphthalate, and the like; hydrazine derivatives such as hydrazine hydrochloride, hydrazine sulfate, dibenzoyl hydrazine, diacetylhydrazine, trimethylhydrazinium iodide, and the like; amine oxides such as pyridine oxide, trimethylamine oxide, dimethylaniline oxide and the like; compounds containing the group $>C=N-$ and derived from ketaldones, i.e., a ketone or aldehyde such as the azines (containing the group $>C=N-N=C<$) e.g., benzalazine, heptaldazine, diphenyl ketazine and the like; oximes (containing the group >C=NOH) such as acetone oxime, butyraldoxime, dimethylglyoxime, and the like; Schiff's bases (containing the group >C=N—) such as benzalaniline, benzal-p-toluidine, benzaldehyde derivatives of methylamine, ethylamine and heptyl amine, and the like; alcohols such as methanol, ethanol, propanol, butanol, allyl alcohol and the like; aldehydes and ketones such as acetaldehyde, propionaldehyde, crotonaldehyde, acetone, diethyl ketone, methyl propyl ketone and the like.

These catalysts are generally used in amounts from about 0.5 to about 7.5 mole percent of the feed mixture. While it is generally not necessary, even higher amounts of these catalysts may be used, for example, amounts ranging up as high as 10 mole percent of the feed.

Many other variations in procedure and reaction conditions from those given in the example may also be made without departing from the scope of the invention. For example, the reaction may be carried out in a tubular reactor of quartz, porcelain or any other refractory non-catalytic material capable of withstanding the temperatures employed as well as in the silica reactor exemplified. The gases can also be passed through a series of reactors heated to reaction temperature, the mixture being cooled as it issues from each reactor to condense and separate the acetonitrile therefrom.

While the preferred reaction temperature is in the range from 800° C. to 900° C., the reaction may be conducted at temperatures as low as 600° C. and as high as 1000° C. or above. With proper equipment such as a shock tube, for example, temperatures as high as 1600° C. can be employed. However, at temperatures above 1000° C. operation is usually inefficient because of by-product formation and decomposition and the fact that the extremely short contact times needed as these temperatures are so difficult to obtain by practical means. Likewise, while reaction does occur at the lower levels, operation at temperatures below 700° C. is not practical because of the low conversions obtained.

Reaction time, i.e., the time during which the reactant mixture is maintained at reaction temperature in the reaction zone, varies with the particular temperature employed. Generally, any decrease in temperature requires an increased reaction time and consequently shorter reaction times are employed with higher temperatures. Reaction times from 0.01 second to 5 seconds are satisfactory in the temperature range from 600° C. to 1000° C. In the preferred temperature range, reaction time may vary from about 2 seconds at 800° C. to about 0.5 second at 900° C.

The pressure employed is preferably atmospheric but operation at either subatmospheric or superatmospheric pressures is feasible.

A wide range of reactant ratios can be employed. Mole ratios of HCN to methane varying from 1:10 to 100:1 can be used but preferably this ratio is kept within the range from 1:1 to 3:1. An excess of HCN appears to be desirable since it not only leads to better yields but also tends to reduce tar and other by-product formation.

Inert gaseous diluents may be present in the reaction mixture and it is frequently desirable to employ diluents such as nitrogen, argon, carbon dioxide, sulfur dioxide, hydrogen chloride, and the like in order to achieve the short reaction times required. The presence of moisture in the reaction mixture has little effect on the reaction.

Recovery of the acetonitrile product can be effected by low-temperature condensation of the effluent gas mixture followed by fractional distillation of the liquid condensate in a conventional manner. The HCN fraction separated during recovery of the product acetonitrile can be recycled to the reactor if desired. When more than one reactor is used, the condenser (or condensers) between reactors is preferably cooled to a temperature such that substantially all the acetonitrile produced but only a minor portion of the HCN will be condensed. The HCN in the off-gases can then be recovered by absorption in suitable media such as aqueous alkali, for example, then regenerated from said solution and recycled.

What is claimed is:

1. A process for the preparation of acetonitrile which comprises passing hydrogen cyanide and methane together with from about 0.5 to about 7.5 mole percent of a compound chosen from the group consisting of propylene, and dimethyl ether through a reaction zone heated to a temperature within the range from about 600° to about 1000° C. at a rate such that the reaction time of said reactants in said reaction zone is in the range from about 0.01 to about 5 seconds.

2. The process of claim 1 wherein said reaction zone is heated to a temperature within the range from about 800° to about 900° C.

3. The process of claim 2 wherein the reaction time is in the range from about 0.5 second to about 2 seconds.

4. The process of claim 3 wherein said free-radical-generating compound is propylene.

5. The process of claim 3 wherein said free-radical-generating compound is dimethyl ether.

References Cited in the file of this patent

UNITED STATES PATENTS

| | | |
|---|---|---|
| 2,802,020 | Fierce et al. | Aug. 6, 1957 |
| 2,915,548 | Andres | Dec. 1, 1959 |
| 2,952,597 | Cleaver et al. | Sept. 13, 1960 |
| 3,028,413 | Fierce et al. | Apr. 3, 1962 |

OTHER REFERENCES

Thompson: Faraday Society, vol. 37 (1941), pp. 349–350.